United States Patent Office 2,992,157
Patented July 11, 1961

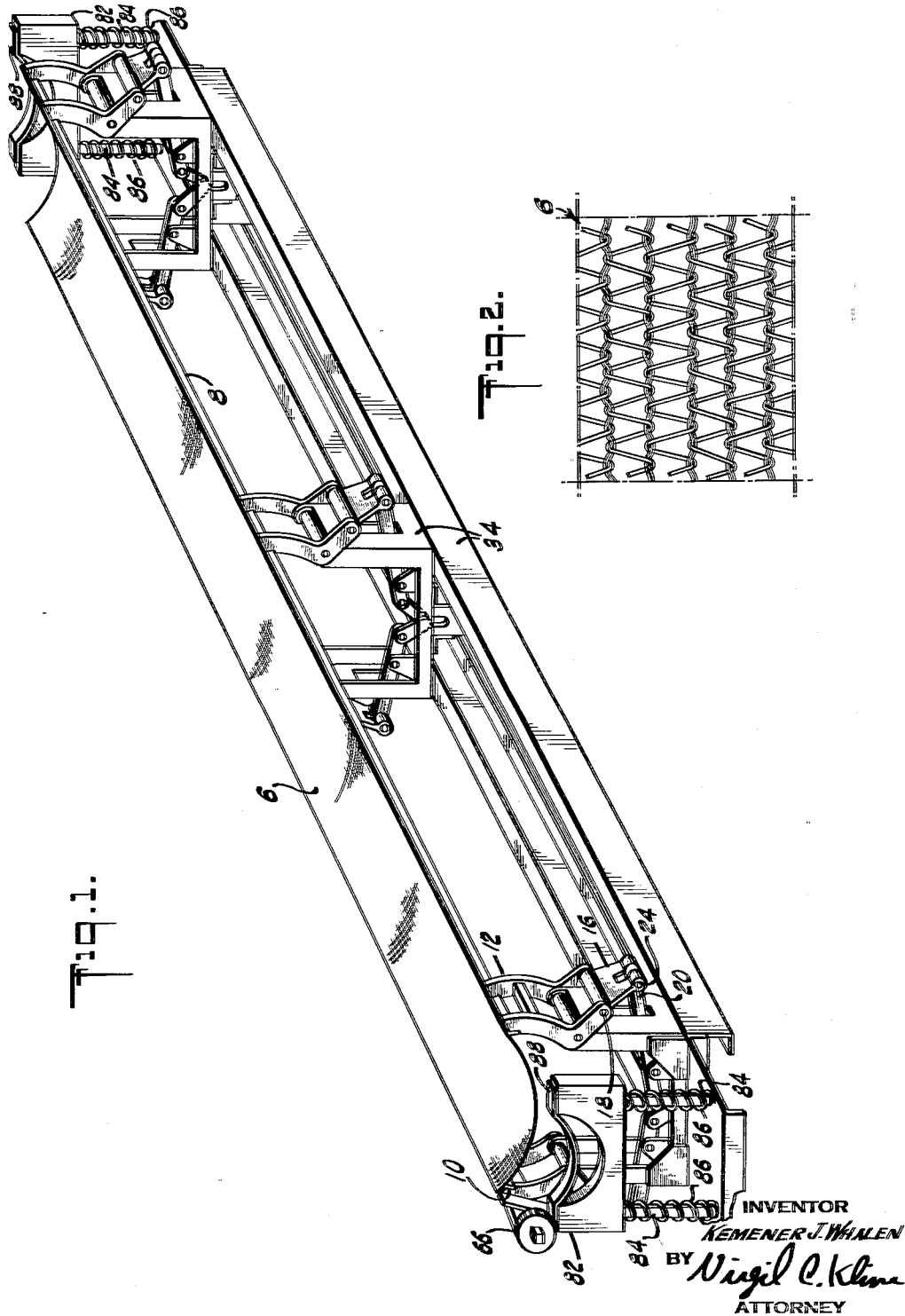

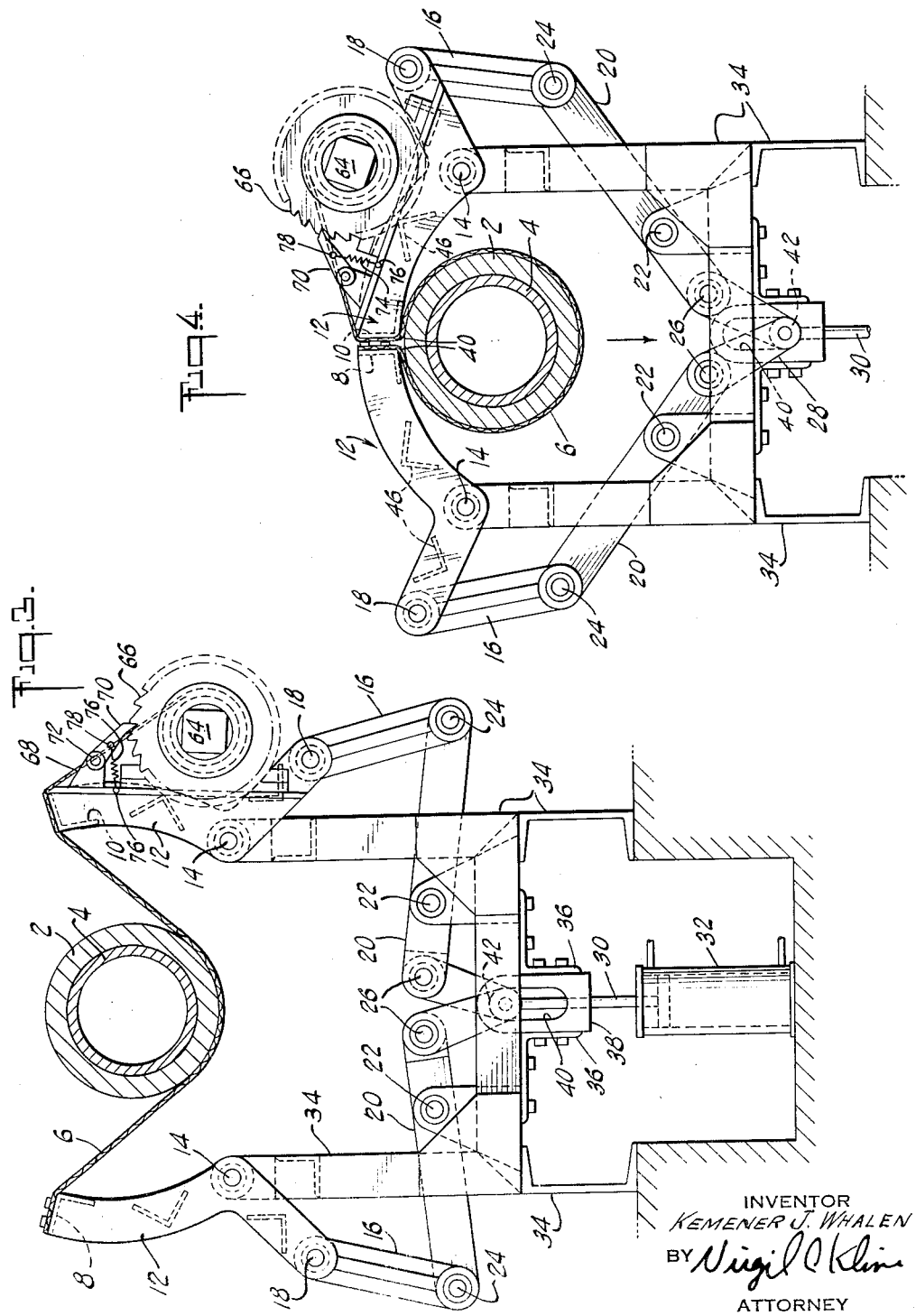

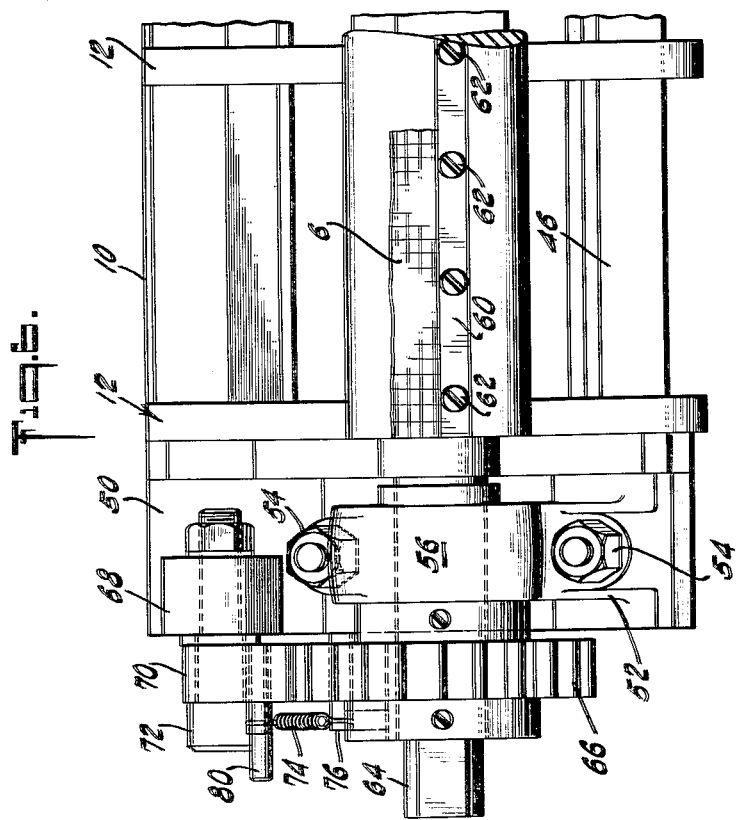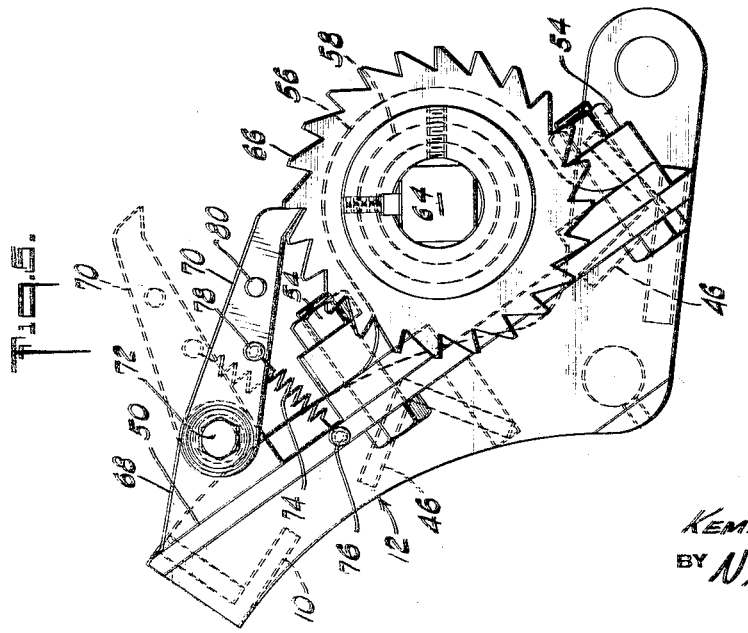

2,992,157
METHOD AND APPARATUS FOR LOOSENING A PIPE FROM A MANDREL
Kemener J. Whalen, Bound Brook, N.J., assignor to Johns-Manville Corporation, New York, N.Y., a corporation of New York
Continuation of application Ser. No. 440,367, June 30, 1954. This application Dec. 3, 1958, Ser. No. 778,036
9 Claims. (Cl. 162—192)

The present invention relates to a method and apparatus for loosening a wet cementitious pipe from the mandrel on which it is formed. In conventional manufacture of asbestos-cement pipe, a wet sheet of pulp is wound on a rotating hollow mandrel while high pressure is applied thereto in order to compact the material. By reason of this method of manufacture the pipe as formed is firmly bonded to the mandrel and the breaking of this bond is a problem which has never been satisfactorily solved for all types and sizes of pipe. This application is a continuation of application Serial No. 440,367, filed June 30, 1954, now forfeited.

A primary object of the present invention is to provide a method and apparatus whereby thin wall pipe may be loosened from the mandrel on which it is formed with a minimum of mechanical action on the pipe.

A further object of the present invention is to provide a method and apparatus whereby electrical current is employed to loosen the pipe from the mandrel and the method and arrangement is such that substantial uniformity of current flow is attained through various areas of the pipe.

My invention will be more fully understood and further objects and advantages thereof will become apparent when reference is made to the following detailed description and to the accompanying drawing in which:

FIGURE 1 is an isometric view, partially schematic, showing the apparatus of the present invention;

FIGURE 2 is an illustration of one type of screen which may be used in the apparatus of FIGURE 1;

FIGURES 3 and 4 are end views of the apparatus of FIGURE 1 as seen from the upper end, the device being shown in two different operating positions;

FIGURE 5 is a detailed view of the ratchet or lock means employed with the apparatus of this invention; and FIGURE 6 is an elevation of the device shown in FIGURE 5.

Referring to the drawings and particularly to FIGURE 3, there is shown a pipe 2 bonded to a mandrel 4 and supported on a screen 6. In general, the loosening of pipe 2 from the mandrel 4 is accomplished by wrapping the electrically conductive screen 6 around the pipe 2, engaging the mandrel 4 with electrical contacts, and passing an electrical current through the screen, the pipe and the mandrel, which current is believed to cause, through electrolysis, the formation of a layer of gas between the pipe and the mandrel. Whether the phenomenon actually results from electrolysis is not important, since it is an observed fact that passing a current through the pipe does effect loosening thereof.

In essence, the apparatus illustrated in the drawings is a means for wrapping screen 6 around pipe 2, the electrical portion of the apparatus not being illustrated. It will be noted that one side edge of screen 6 is attached to a bar 8 while the opposite side portion of the screen extends over, but is not secured to, a bar 10. The bars 8 and 10 are each supported by a crank arm 12, mounted on fixed pivot 14 and having a link 16 pivotally connected to the lower end thereof at 18. Levers 20 mounted on fixed pivots 22 are pivotally connected to link 16 at 24. The opposite ends 26 of the levers 20 are pivotally connected to links 28, which links are pivotally connected to the piston rod 30 of an air cylinder arrangement 32. A framework 34 is provided for supporting the fixed pivots 14 and 22. The framework also supports brackets 36 on which is mounted a member 38 having a slot 40 therein for guiding the upper end 42 of rod 30.

Referring to FIGURE 1, it will be seen that each of the cranks 12 actually includes two spaced members 44 connected at the top by the bars 8 or 10 and at other points by the pivot pins and by angle members 46. While such an arrangement is preferred, it will be understood that any mechanical arrangement providing the necessary rigidity will be satisfactory. For purposes of the present invention the entire mechanism described above can be replaced by any alternative mechanism which will provide for movement of the bars 8 and 10 in the same manner as the illustrated mechanism.

Secured to each of those cranks 12 which support the bar 10 at its ends is a plate 50 having a bearing bracket 52 secured thereto by means of bolts 54. Bearings 56 support a rotatable shaft 58 to which one side edge of the screen 6 is attached as by means of a strap 60 (FIGURE 6) and screws 62. The shaft 58 has a reduced end portion 64 which extends through one bearing 56 and is provided with a plurality of flat surfaces whereby a ratchet wheel 66 may be attached thereto. Mounted on plate 50 adjacent the ratchet is a bracket 68 having a pawl member 70 pivotally mounted thereon at 72. Spring 74 has the opposite ends 76 and 78 thereof secured respectively to the plate 50 and pawl 70, whereby the pawl is urged toward ratchet 66. The screen 6 is wrapped around the shaft 58 by rotating the shaft in a clockwise direction (as viewed in FIGURE 5) and because the pawl 70 is forced into the teeth of the ratchet wheel 66 by the spring 74, the weight of screen 6 with the pipe and mandrel thereon is prevented from causing unwinding of the screen from the shaft 58. When it is desired to permit such unwinding, the pawl 70 may be lifted manually by pin 80. If desired a ratchet and pawl arrangement may be mounted at both ends of shaft 58.

In FIGURE 2 there is illustrated one form of knitted mesh which is suitable for forming screen 6. The exact mesh used is not critical, it being necessary only that the screen be of fairly heavy electrically conductive wire, preferably stainless steel, and have a close enough mesh to provide good contact with the surface of pipe 2. The screen is of slightly less length than the pipe to be loosened, and since the mandrel protrudes from each end of the pipe, mandrel contacts 88 are spaced a short distance from each end of the screen. Each strap 88, preferably formed of copper, is mounted on a block 82 having holes drilled in the lower side thereof to slidably receive posts 84 surrounded by springs 86 which support the blocks.

Screen 6 and the contact straps 88 are connected in any suitable manner to a D.C. generator such as a 150 volt D.C. generator of a rated capacity of 600 amperes. The screen 6 is connected to the positive terminal, whereas the straps 88 are connected to the negative terminal or to ground. Any suitable automatic control circuit may be employed for connecting and disconnecting the screen and straps with the source in such a manner as to provide maximum safety and to prevent damage from arcing. A circuit of the type disclosed in the application of Joseph L. Ramm, Serial No. 287,701, filed May 14, 1952, may be employed, but any number of satisfactory control circuits will be known to those skilled in the art.

In operation, a pipe 2 adhered to a mandrel 4 is placed on the screen 6 with the screen in the condition shown in FIGURE 3. It will be understood that the effective width of screen 6; i.e., the width of screen available for wrapping around the pipe, will have been adjusted by manipulation of shaft 58 and ratchet 66, so as to be substantially equal to the outer circumference of pipe 2. Depending upon the size of pipe to be handled, the screen 6 between the bars 8 and 10 will have more or less curvature, and because of this curvature, placing a pipe and mandrel on the screen results in the pipe assuming a position in which it extends parallel to the bars 8 and 10. When properly positioned the pipe is engaged by the screen and the exposed ends of the mandrel are opposite the straps 88.

The bars 8 and 10 are so mounted and the linkage mechanism is such that, upon actuation of air cylinder 32 the cranks 12 are pivoted so as to bring bars 8 and 10, and thus the effective side edges 90 of screen 6, into adjacent relationship to form a loop corresponding in size to the pipe, as illustrated in FIGURE 4. With the effective width of screen 6 properly adjusted, the result of actuation of the mechanism is to wrap the screen 6 substantially completely around the pipe. During this wrapping action it will be noted that the pipe is lowered to a considerable extent and moves the mandrel into firm contact with resiliently mounted straps 88.

With the screen wrapped around the pipe, the screen, the pipe, the mandrel and the mandrel contacts become series associated elements of a circuit. Energizing the circuit causes the flow of a current through the pipe which effects a loosening of the pipe from the mandrel. After the circuit is de-energized (voltage reduced to zero) the mechanism may be safely returned to the position shown in FIGURE 3 and the pipe and mandrel removed for separation and curing of the pipe.

One of the important advantages of the method and apparatus of the present invention is that the pipe remains in a substantially non-rotating position during the wrapping of the screen around the pipe and, in fact, during the entire loosening operation. Thin wall, wet, cementitious pipe has insufficient strength to permit any rough mechanical action such as results from calendering or otherwise contacting the surface with rollers or other relatively moving contacts. From the time the pipe settles on the screen of the present invention there is substantially no transverse relative movement of the pipe and screen and the pipe is subjected to no distorting forces. It will also be noted that because the screen is wrapped substantially completely around the pipe, there results good electrical contact and substantial uniformity of current through the various sections or areas of the pipe. Thus, effective and uniform loosening of the pipe is accomplished.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A method of loosening a wet pipe from an electrically conductive mandrel comprising wrapping an electrically conductive screen around the pipe, forming an electrical circuit including the screen, the pipe and the mandrel as series associated elements, and loosening the pipe from the mandrel by passing an electrical direct current through said circuit flowing in the direction from said screen toward said mandrel while maintaining said pipe and said screen substantially immobile relative to each other.

2. A method of loosening a wet pipe from an electrically conductive mandrel comprising wrapping an electrically conductive screen substantially completely around the pipe, forming an electrical circuit including the screen, the pipe and the mandrel as series associated elements, and loosening the pipe from the mandrel by passing an electrical direct current through said circuit flowing in the direction from said screen toward said mandrel while maintaining said pipe and said screen substantially immobile relative to each other.

3. A method of loosening a wet pipe from an electrically conductive mandrel comprising supporting the pipe and mandrel on an electrically conductive screen, wrapping said screen around the pipe, forming an electrical circuit including the screen, the pipe and the mandrel as series associated elements, and loosening the pipe from the mandrel by passing an electrical direct current through said circuit flowing in the direction from said screen toward said mandrel while maintaining said pipe and said screen substantially immobile relative to each other.

4. A method of loosening a wet pipe from an electrically conductive mandrel comprising supporting the pipe and mandrel on an electrically conductive screen, maintaining the pipe and mandrel in substantially non-rotating condition while wrapping said screen around the pipe, forming an electrical circuit including the screen, the pipe and the mandrel as series associated elements, and loosening the pipe from the mandrel by passing an electrical direct current through said circuit flowing in the direction from said screen toward said mandrel while maintaining said pipe and said screen substantially immobile relative to each other.

5. A method of loosening a wet pipe from an electrically conductive mandrel comprising supporting the pipe and mandrel on an electrically conductive screen having an effective width equal to the outer circumference of the pipe and with the pipe extending parallel to the effective side edges of the screen, moving said side edges toward each other to wrap the screen around the pipe, forming an electrical circuit including the screen, the pipe and the mandrel as series associated elements, and loosening the pipe from the mandrel by passing an electrical direct current through said circuit flowing in the direction from said screen toward said mandrel while maintaining said pipe and said screen substantially immobile relative to each other.

6. Apparatus for loosening a wet pipe from an electrically conductive mandrel comprising an electrically conductive screen, means for wrapping said screen around said pipe, said screen holding said pipe in a position substantially immobile relative to said screen, an electrical direct current source, means electrically connecting said screen to the positive terminal of said electrical direct current source, and means electrically connecting said mandrel to the negative terminal of said electrical direct current source.

7. Apparatus for loosening a wet pipe from an electrically conductive mandrel comprising an electrically conductive screen having an effective width substantially equal to the outer circumstance of said pipe, means for moving the effective side edges of the screen into adjacent relation, said screen being in the form of a loop corresponding in size to said pipe when said side edges are adjacent, said screen holding said pipe in a position substantially immobile relative to said screen, an electrical direct current source, means electrically connecting said screen to the positive terminal of said electrical direct current source, and means electrically connecting said mandrel to the negative terminal of said electrical direct current source.

8. Apparatus for loosening a wet pipe from an electrically conductive mandrel comprising an electrically conductive screen having an edge portion thereof secured to a first bar and an opposite edge portion extending over a second bar parallel to said first bar, the length of screen between said bars being substantially equal to the outer circumference of said pipe, means for effecting relative movement of said bars to bring the bars in adjacent relation and form a loop of the screen, and means for passing an electrical direct current through said screen, said pipe and said mandrel flowing in the direction from said screen toward said mandrel.

9. Apparatus for loosening a wet pipe from an electrically conductive mandrel comprising a pair of parallel bars, opposed pairs of pivoted arms supporting said bars for movement toward and away from each other, the length of said arms and the position of the pivots therefor being such that said bars are movable into contact with each other, linkage means connecting opposed arms to each other and arranged to cause simultaneous pivoting of said arms, piston means connected to said linkage means for pivoting said arms, an electrically conductive screen having side and end edges, means for securing one side edge of said screen to one of said bars, a rotatable shaft mounted on the pivoted arms supporting the other of said bars, pawl means releasably locking said shaft against rotation, said screen being arranged to extend over the other of said bars and around said shaft with the other side edge of said screen being secured to said shaft, an electrical direct current source, means connecting said screen to the positive terminal of said electrical direct current source, and resiliently mounted electrical contact means positioned adjacent the end edges of said screen and connected to the negative terminal of said electrical direct current source.

References Cited in the file of this patent

UNITED STATES PATENTS

| | | |
|---|---|---|
| 2,430,411 | Rembert | Nov. 4, 1947 |
| 2,892,750 | Ramm | June 30, 1959 |

FOREIGN PATENTS

| | | |
|---|---|---|
| 545,173 | Great Britain | May 13, 1942 |